United States Patent
Belkar et al.

(10) Patent No.: US 12,294,625 B2
(45) Date of Patent: May 6, 2025

(54) DEVICE AND METHOD FOR ROMOTE DIRECT MEMORY ACCESS

(71) Applicant: Huawei Technologies Co., Ltd., Shenzhen (CN)

(72) Inventors: Ben-Shahar Belkar, Hod Hasharon (IL); Ronen Hyatt, Hod Hasharon (IL); Danny Volkind, Hod Hasharon (IL); Tal Mizrahi, Hod Hasharon (IL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 381 days.

(21) Appl. No.: 17/668,984

(22) Filed: Feb. 10, 2022

(65) Prior Publication Data
US 2022/0166832 A1 May 26, 2022

Related U.S. Application Data

(63) Continuation of application No. PCT/EP2020/060660, filed on Apr. 16, 2020.

(51) Int. Cl.
*H04L 67/1097* (2022.01)
*H04L 9/40* (2022.01)
*H04L 69/22* (2022.01)

(52) U.S. Cl.
CPC ...... *H04L 67/1097* (2013.01); *H04L 63/0428* (2013.01); *H04L 69/22* (2013.01)

(58) Field of Classification Search
CPC . H04L 67/1097; H04L 63/0428; H04L 69/22; H04L 69/164; G06F 15/17331
See application file for complete search history.

(56) References Cited

U.S. PATENT DOCUMENTS

| | | | |
|---|---|---|---|
| 7,281,030 B1 | 10/2007 | Davis | |
| 2017/0357611 A1* | 12/2017 | Cherian | H04L 67/1097 |
| 2019/0044705 A1 | 2/2019 | Deval et al. | |
| 2019/0207868 A1* | 7/2019 | Chang | H04L 47/83 |
| 2019/0229903 A1* | 7/2019 | Balasubramanian | H04L 9/0631 |
| 2019/0356589 A1* | 11/2019 | Louzoun | H04L 49/9042 |

FOREIGN PATENT DOCUMENTS

CN 110278183 A 9/2019

OTHER PUBLICATIONS

"Supplement to InfiniBandTM, Architecture Specification, vol. 1 Release 1.2.1, Annex A16:RDMA over Converged Ethernet (RoCE)," Apr. 6, 2010, 19 pages.
"Supplement to InfiniBandTM, Architecture Specification, vol. 1 Release 1.2.1, Annex A17:RoCEv2," Sep. 2, 2014, 23 pages.

(Continued)

*Primary Examiner* — Cheikh T Ndiaye
(74) *Attorney, Agent, or Firm* — Conley Rose, P.C.

(57) ABSTRACT

A network device is configured to transmit an outgoing packet to another network device. The outgoing packet is a Quick User Datagram Protocol Internet Connection (QUIC)-based packet, which comprises a User Datagram Protocol (UDP) header, a QUIC header, and a QUIC payload. The UDP header comprises an indication that the QUIC payload comprises one or more RDMA transactions. The QUIC payload comprises the one or more RDMA transactions.

20 Claims, 13 Drawing Sheets

(56) References Cited

OTHER PUBLICATIONS

Iyengar, Ed. et al., "QUIC: A UDP-Based Multiplexed and Secure Transport; draft-ietf-quic-transport-20," QUIC, Internet-Draft, Apr. 23, 2019, 143 pages.

Recio, R., et al., "A Remote Direct Memory Access Protocol Specification," RFC 5040, Oct. 2007, 66 pages.

"InfiniBandTM Architecture; Specification vol. 1,Release 1.2.1," Nov. 2007, 1727 pages.

Guo, Z., et al., "Traffic Control for RDMA-Enabled Data Center Networks: A Survey," IEEE Systems Journal, vol. 14, No. 1, Mar. 2020, 12 pages.

George, M., et al., "SMB3 directions and landscape," Sep. 24-27, 2018, 20 pages.

Congdon, P., "IETF-104 HotRFC and Side Meeting on Hyperscaler HPC/RDMA," IETF-104 HotRFC, Apr. 23, 2019, 11 pages.

\* cited by examiner

DEVICE AND METHOD FOR ROMOTE DIRECT MEMORY ACCESS

CROSS-REFERENCE TO RELATED APPLICATIONS

This is a continuation of International Patent Application No. PCT/EP2020/060660 filed on Apr. 16, 2020, which is hereby incorporated by reference in its entirety.

TECHNICAL FIELD

The present disclosure relates to high performance computing technologies, in particular, to remote direct memory access (RDMA) technologies. The disclosure allows transporting RDMA transactions over a packet-based network. To this end, the present disclosure provides a device, a method and a data packet format for RDMA.

BACKGROUND

High performance computing (HPC) applications often require a computer to be able to access a memory that resides on a remote computer. RDMA technology allows a computer to perform such memory access operations without involving an operating system that runs on the computer.

One RDMA technology is defined in the InfiniBand (IB) specification, and another RDMA technology is defined by the Internet Engineering Task Force (IETF). The IETF protocol is also referred to as internet wide area RDMA protocol (iWARP). Specifically, IB RDMA has two variants that allow it to run over Internet Protocol (IP)/Ethernet networks. These two versions of RDMA over Converged Ethernet (RoCE) are referred to as RoCE version 1 (RoCEv1) and RoCE version 2 (RoCEv2).

Desired properties of RDMA technologies include: RDMA transport over packet-based (Ethernet/IP) network; RDMA transport over wide area network (WAN), fast connection setup, built-in reliability (lossless or fast recovery), fast connection migration, low latency, overall bandwidth utilization and no infrastructure changes (as opposed to RoCE, for example, which relies on infrastructure features such as priority flow control).

Some RDMA solutions may not provide all of the desired properties of RDMA technologies and may provide only a subset of these properties.

A device on a network needs to perform all kinds of service control using a policy. For example, in a service execution procedure, a condition is first specified when a certain action needs to be executed, and the corresponding action is executed only when a packet or a data flow meets the set condition. A typical condition includes a condition such as a user dimension, a time dimension, a layer 3 (L3)-layer 4 (L4) (an IP address+a Transmission Control Protocol (TCP) port number) dimension, an layer 7 (L7) protocol dimension, and a uniform resource locator (URL) dimension. A policy matching procedure is a procedure for comparing information of each dimension of a data flow with a set condition of the dimension.

Information of each dimension of a data flow is generally collected by different data processing modules. For example, user dimension information is identified by a user identifying module, time dimension information is identified by a time module, L3-L4 information is identified by an L3-L4 processing module, L7 protocol information is identified by an identifying module, and URL information is identified by a parsing module. More data processing modules need to be disposed on the device on the network to collect information of more dimensions if it is expected that there are richer device policies and more controllable dimensions.

Generally, each data processing module on the device on the network has a fixed function and is configured to determine collected information according to set logic. For example, a user management module is configured to determine all kinds of preset information of a user that needs to be collected, such as an IP, a mobile phone number, a role, and a class. Therefore, a procedure for collecting dimension information of a data flow becomes a procedure for executing each data processing module. For clear logic on the device, generally, information of the data flow needs to be first collected, then policy matching is performed, and finally an action corresponding to a policy is executed. A disadvantage of the foregoing procedure is that all modules configured to collect information are executed, thereby wasting device performance.

As shown in FIG. 1, all dimension information of a data flow is first collected. Then searching is performed in an information set to determine whether a set condition is met, and a corresponding action is executed if the set condition is met. That is, all modules configured to collect information are connected in series, and a fixed sequence is set. All flows undergo a same processing process and pass through each module according to the sequence. In this way, when all modules have been executed, information of each dimension is collected completely and can provide a basis for subsequent policy matching. In this method, design is simple, information is complete, and no function is omitted.

However, a disadvantage of the foregoing method is that an execution sequence for all data flows is the same, thereby ignoring a difference between the data flows. Information of different data flows is different. It is obvious that some data flows do not need to pass through a specific module. Therefore, collection of certain redundant information exists during sequential execution, thereby causing extra performance overhead.

SUMMARY

In view of the above-mentioned challenges, embodiments of the present disclosure aim to provide a device and a method for transporting RDMA transactions. An objective is, in particular, to transport RDMA transactions over packet-based networks. One aim is to provide an RDMA transporting method with high reliability. Further, it is desirable to enable all aforementioned desired properties of RDMA technologies.

The objective is achieved by the embodiments of the present disclosure as described in the enclosed independent claims. Advantageous implementations of the embodiments of the present disclosure are further defined in the dependent claims.

A first aspect of the present disclosure provides a network device for RDMA. The network device is configured to transmit an outgoing packet to another network device. The outgoing packet to be transmitted is a Quick User Datagram Protocol Internet Connection (QUIC)-based packet. The outgoing packet comprises a User Datagram Protocol (UDP) header, a QUIC header and a QUIC payload. The UDP header of the outgoing packet comprises an indication that indicates that the QUIC payload of the outgoing packet comprises one or more RDMA transactions, and the QUIC payload of the outgoing packet comprises the one or more RDMA transactions.

Embodiments of the present disclosure provide a solution for running RDMA over a QUIC based transport protocol. This solution provides the aforementioned desired properties of RDMA technologies. Notably, QUIC is a transport layer technology that is being defined in the IETF. It is a reliable transport protocol that can be used as a replacement for the TCP. In particular, QUIC is defined as a reliable layer that runs above the unreliable UDP.

In an implementation form of the first aspect, the UDP header of the outgoing packet further comprises an indication that indicates that the outgoing packet carries the QUIC header and/or the QUIC payload.

For instance, the indication comprised in the UDP header may indicate that, the next header after the UDP header, is a QUIC header. By designing an indication in the UDP header that indicates the outgoing packet carries a QUIC header and/or a QUIC payload, it is easier for a receiving network device (another network device) to detect and determine the outgoing packet is a QUIC based packet, that is, a packet has been processed using a QUIC based transport protocol.

In an implementation form of the first aspect, the network device is further configured to receive an incoming packet from another network device, and the incoming packet is a QUIC based packet. The incoming packet comprises a UDP header, a QUIC header and a QUIC payload. The network device is further configured to detect whether the UDP header of the incoming packet comprises an indication that indicates that the QUIC payload of the incoming packet comprises one or more RDMA transactions. If the indication is detected in the UDP header of the incoming packet, the network device is further configured to obtain the one or more RDMA transactions from the QUIC payload of the incoming packet.

For incoming packets, RDMA over QUIC packets can be detected by using the UDP header, particularly the indication comprised in the UDP header.

In an implementation form of the first aspect, the device is further configured to detect whether the UDP header of the incoming packet comprises an indication that indicates that the incoming packet carries the QUIC header and/or the QUIC payload. By detecting the indication in the UDP header of the incoming packet, the device can easily determine that the incoming packet is a QUIC based packet.

In an implementation form of the first aspect, the indication in the UDP header of the outgoing and/or incoming packet comprises at least one of the following: a reserved source UDP port number, a reserved destination UDP port number, reserved bits inside the UDP header which are not port numbers, a combination of source and destination addresses, and a pre-configured source and/or destination UDP port number.

To indicate or detect that a QUIC payload includes an RDMA transaction, either a specific reserved UDP server port number, or a pre-configured UDP server port number may be used.

Possibly, the RDMA over QUIC transport could also be indicated either by the source port, destination port, or a combination of the two.

In an implementation form of the first aspect, the outgoing and/or incoming packet has a version field indicating a version of the QUIC based protocol. By assigning a version field indicating a version of the QUIC based protocol, it is easier to determine the version number of QUIC based protocol for processing the outgoing and/or incoming packet.

Optionally, using a dedicated QUIC version number for RDMA over QUIC transport, may enable non-standard QUIC features, for example, disable encryption.

In an implementation form of the first aspect, the device is further configured to encrypt the outgoing packet before transmitting to another network device.

The IETF defines the encryption as part of the QUIC protocol. However, this disclosure proposes a new version that keeps the encryption as an option. That is, the QUIC encryption may be disabled (non-standard mode) in networks that do not require confidentiality protection.

In an implementation form of the first aspect, the network device is configured to: receive an RDMA application request or event; map the RDMA application request or event to a QUIC request or event; and generate the outgoing packet according to the QUIC request or event.

A mapping layer for mapping the RDMA application requests and events to QUIC requests and events can be provided.

In an implementation form of the first aspect, the network device comprises an RDMA application programming interface (API) and the network device is configured to receive the RDMA application request or event from the RDMA API.

With the RDMA API being provided, the QUIC transport can be transparently used without affecting applications.

In an implementation form of the first aspect, the network device is further configured to pass the one or more RDMA transactions obtained from the QUIC payload of the incoming packet to the RDMA API.

The mapping layer may map received RDMA transactions over QUIC to RDMA transactions, for instance, by removing the QUIC encapsulation, then further passing the RDMA transactions to the RDMA API.

In an implementation form of the first aspect, the QUIC payload of the outgoing packet and/or the QUIC payload of the incoming packet comprises one or more QUIC frames, and the one or more QUIC frames comprise one or more RDMA transactions.

In an implementation form of the first aspect, each QUIC frame of the QUIC payload of the outgoing packet and/or each QUIC frame of the QUIC payload of the incoming packet comprises an RDMA transaction.

Possibly, a single QUIC connection could carry either a single RDMA connection content or more than one RDMA connection.

In an implementation form of the first aspect, the one or more RDMA transactions comprise an IB RDMA transaction, an iWARP transaction, and/or a transaction according to any derivative of an RDMA protocol.

Notably, this disclosure allows to carry any RDMA protocol in the QUIC protocol.

In an implementation form of the first aspect, at least one RDMA transaction is carried in at least one queue pair (QP) (a queue pair or a group of QPs), and the at least one QP is comprised by the one or more QUIC frames in the QUIC payload of the outgoing packet and/or of the incoming packet. For example, if there is only one QP, the QP may be comprised by any one or a pre-determined QUIC frame, if there are more than two QPs, for each QP, it may be comprised by anyone or a pre-determined QUIC frame.

A send queue (SQ) and a receive queue (RQ) are always created in pair and thus called as a QP. Optionally, each QP or group of QPs may be mapped to a separate QUIC connection.

In an implementation form of the first aspect, at least one RDMA transaction is a Working Queue Element (WQE), and the WQE is comprised by the one or more QUIC frames in the QUIC payload of the outgoing packet and/or of the incoming packet.

A WQE is placed inside a SQ or a RQ, which could be any operation such as read/write/send/receive etc. Each operation can be translated into one or more packets. Each WQE may be encapsulated in a QUIC frame or may be broken down into multiple QUIC frames. A QUIC packet may include multiple frames such that one or more of the frames is a WQE.

In an implementation form of the first aspect, the one or more RDMA transactions comprise one or more short transactions (i.e. a short transaction means the transaction has a transaction length of short size, for example, the short transaction may be completed in a small number of packets) and one or more long transactions (i.e. a long transaction means the transaction has a transaction length of long size, for example, the long transaction may be completed in a large number of packets), and the network device is further configured to handle the one or more short transactions before the one or more long transactions.

Optionally, out-of-order transaction completion may be allowed according to this disclosure. In particular, short transactions may be completed before long transactions. However, it should be noted that application completion entries will be posted on the completion queue in order.

In an implementation form of the first aspect, the network device is an RDMA server or an RDMA client.

A second aspect of the present disclosure provides a method for RDMA, wherein the method comprises: transmitting an outgoing packet to another network device, wherein the outgoing packet is a QUIC based packet, which comprises a UDP header, a QUIC header and a QUIC payload, wherein the UDP header of the outgoing packet comprises an indication that indicates that the outgoing packet carries the QUIC payload and that the QUIC payload of the outgoing packet comprises one or more RDMA transactions, and wherein the QUIC payload of the outgoing packet comprises the one or more RDMA transactions.

In an implementation form of the first aspect, the UDP header of the outgoing packet further comprises an indication that indicates that the outgoing packet carries the QUIC header and/or the QUIC payload.

In an implementation form of the second aspect, the method further comprises receiving an incoming packet from another network device, wherein the incoming packet is a QUIC based packet, which comprises a UDP header, a QUIC header and a QUIC payload; detect whether the UDP header of the incoming packet comprises an indication that indicates that the QUIC payload of the incoming packet comprises one or more RDMA transactions; and obtain the one or more RDMA transactions from the QUIC payload of the incoming packet, if the indication is detected in the UDP header of the incoming packet.

In an implementation form of the second aspect, the method further comprises detecting whether the UDP header of the incoming packet comprises an indication that indicates that the incoming packet carries the QUIC header and/or the QUIC payload.

In an implementation form of the second aspect, the indication in the UDP header of the outgoing and/or incoming packet comprises at least one of the following: a reserved source UDP port UDP server port number, a reserved destination UDP port, reserved bits, a combination of source and destination addresses, and a pre-configured source and/or destination UDP port number.

In an implementation form of the second aspect, the outgoing and/or incoming packet has a version field indicating a version of the QUIC based protocol.

In an implementation form of the second aspect, the method further comprises encrypting the outgoing packet before transmitting to another network device.

In an implementation form of the second aspect, the method further comprises: receiving an RDMA application request or event; mapping the RDMA application request or event to a QUIC request or event; and generating the outgoing packet according to the QUIC request or event.

In an implementation form of the second aspect, the method is performed by a network device comprising an RDMA API, and the method further comprises receiving the RDMA application request or event from the RDMA API.

In an implementation form of the second aspect, the method further comprises passing the one or more RDMA transactions obtained from the QUIC payload of the incoming packet to the RDMA API.

In an implementation form of the second aspect, the QUIC payload of the outgoing packet and/or the QUIC payload of the incoming packet comprises one or more QUIC frames, and the one or more QUIC frames comprise one or more RDMA transactions.

In an implementation form of the second aspect, each QUIC frame of the QUIC payload of the outgoing packet and/or each QUIC frame of the QUIC payload of the incoming packet comprises an RDMA transaction.

In an implementation form of the second aspect, the one or more RDMA transactions comprise an IB RDMA transaction, an iWARP transaction, and/or a transaction according to any derivative of an RDMA protocol.

In an implementation form of the second aspect, at least one RDMA transaction is carried in a QP, or a group of QPs, and the QP or the group of QP is comprised by the one or more QUIC frames in the QUIC payload of the outgoing packet and/or of the incoming packet.

In an implementation form of the second aspect, at least one RDMA transaction is a WQE, and the WQE is comprised by the one or more QUIC frames in the QUIC payload of the outgoing packet and/or of the incoming packet.

In an implementation form of the second aspect, the one or more RDMA transactions comprise one or more short transactions and one or more long transactions, and the network device is further configured to handle the one or more short transactions before the one or more long transactions.

The method of the second aspect and its implementation forms provide the same advantages and effects as described above for the device of the first aspect and its respective implementation forms.

A third aspect of the present disclosure provides a data packet for RDMA. The data packet is a QUIC based packet, and it comprises a UDP header, a QUIC header and a QUIC payload. The UDP header of the data packet comprises an indication that indicates that the QUIC payload of the data packet comprises one or more RDMA transactions, and the QUIC payload of the data packet comprises the one or more RDMA transactions.

A fourth aspect of the present disclosure provides a computer program comprising a program code for carrying out, when implemented on a processor, the method according to the second aspect or any of its implementation forms.

A fifth aspect of the present disclosure provides a computer readable storage medium comprising computer program code instructions, being executable by a computer, for performing a method according to the second aspect or any of its implementation forms when the computer program code instructions runs on a computer.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following, description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms will be explained in the following description of specific embodiments in relation to the enclosed drawings.

DESCRIPTION OF EMBODIMENTS

Illustrative embodiments of method, device, and program product for efficient packet transmission in a communication system are described with reference to the figures. Although this description provides a detailed example of possible implementations, it should be noted that the details are intended to be exemplary and in no way limit the scope of the application.

Moreover, an embodiment/example may refer to other embodiments/examples. For example, any description including but not limited to terminology, element, process, explanation and/or technical advantage mentioned in one embodiment/example is applicative to the other embodiments/examples.

Figure 1:
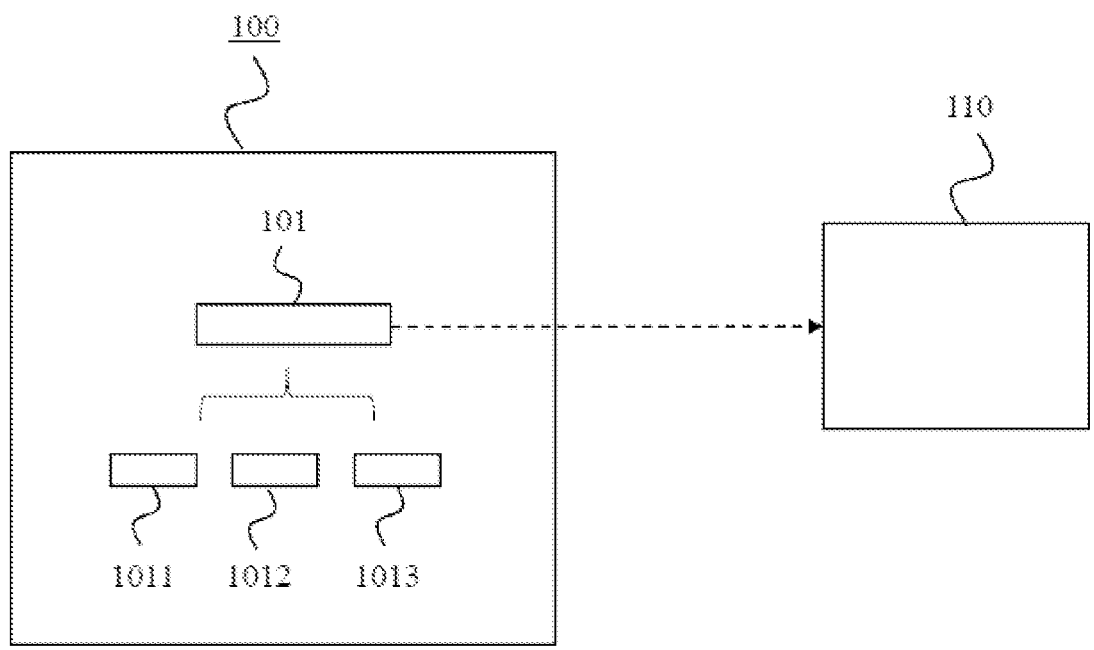
FIG. 1 shows a device according to an embodiment of the present disclosure.

FIG. 1 shows a network device 100 adapted for RDMA according to an embodiment of the present disclosure. The network device 100 may comprise processing circuitry (not shown) configured to perform, conduct or initiate the various operations of the network device 100 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. The network device 100 may further comprise memory circuitry which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the network device 100 to be performed. In one embodiment, the processing circuitry comprises one or more processors and a non-transitory memory connected to the one or more processors. The non-transitory memory may carry executable program code which, when executed by the one or more processors, causes the network device 100 to perform, conduct or initiate the operations or methods described herein.

In particular, the network device 100 is configured to transmit an outgoing packet 101 to another network device 110. The other network device 110, according to embodiments of the present disclosure, may have similar structures as the network device 100. The outgoing packet 101 is a QUIC based packet, which comprises a UDP header 1011, a QUIC header 1012 and a QUIC payload 1013. In particular, the UDP header 1011 of the outgoing packet 101 comprises an indication that indicates that the QUIC payload 1013 of the outgoing packet 101 comprises one or more RDMA transactions. Further, the QUIC payload 1013 of the outgoing packet 101 comprises the one or more RDMA transactions.

In particular, QUIC is a transport layer protocol built on top of UDP. QUIC supports a set of multiplexed connections between two endpoints over UDP, and may provide security protection equivalent to transport layer security/secure sockets layer (TLS/SSL), along with reduced connection and transport latency, and bandwidth estimation in each direction to avoid congestion.

Figure 2:
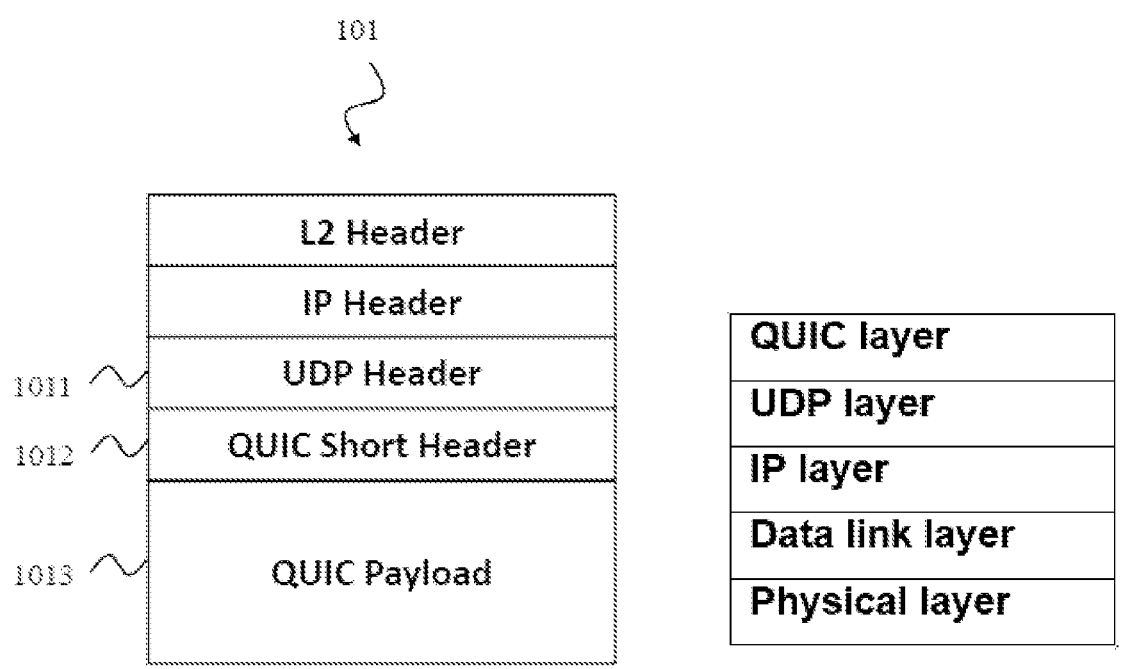
FIG. 2 shows a QUIC packet format according to an embodiment of the present disclosure.

A typical QUIC packet format, according to an embodiment of the present disclosure, is illustrated in FIG. 2. Notably, same elements in all figures are labeled with the same reference signs and function likewise. QUIC implements TCP concepts, and brings a reliability to UDP. It should be understood that, even TCP can have packet loss, but it can be recovered using different retransmission mechanisms. QUIC introduces the same mechanisms over UDP. Notably, there is also an unreliable datagram extension to QUIC for some applications.

Figure 3:
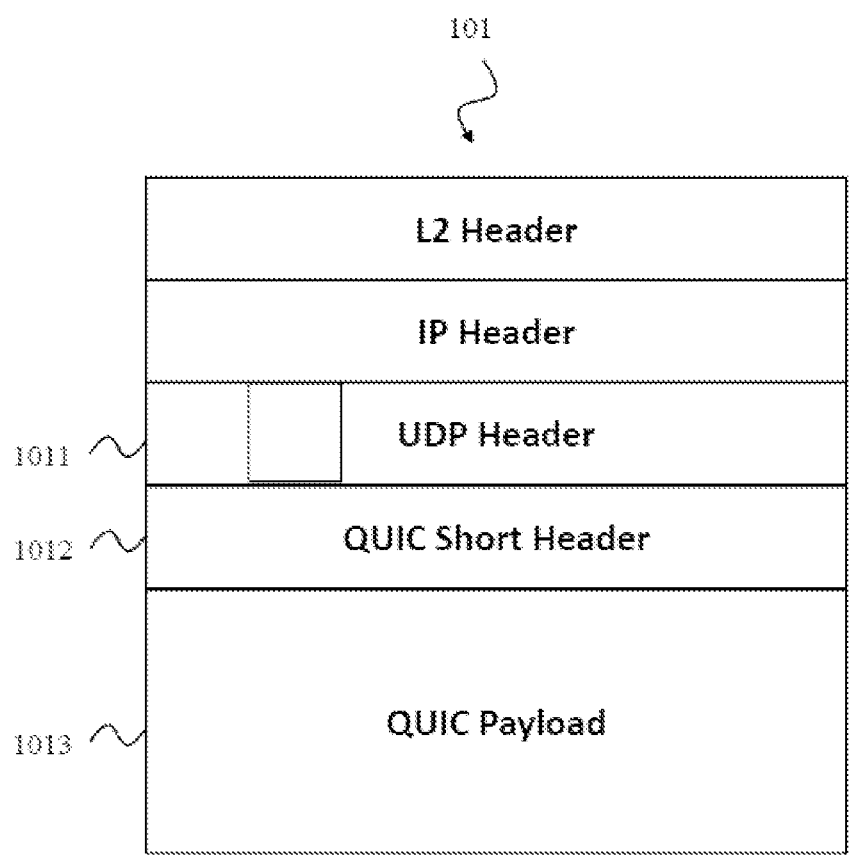
FIG. 3 shows a packet header according to an embodiment of the present disclosure.

FIG. 3 depicts the headers of an RDMA over QUIC packet, according to an embodiment of the present disclosure. A square illustrated in the UDP header 1011 represents the indication, which indicates that the QUIC payload 1013 of the outgoing packet 101 comprises the one or more RDMA transactions.

Optionally, according to an embodiment of the present disclosure, the UDP header 1011 of the outgoing packet 101 may further comprise an indication that indicates that the outgoing packet 101 carries the QUIC header, and/or the QUIC payload 1013. For instance, the indication may indicate that the next header of the UDP header is the QUIC header 1012.

Figure 4:
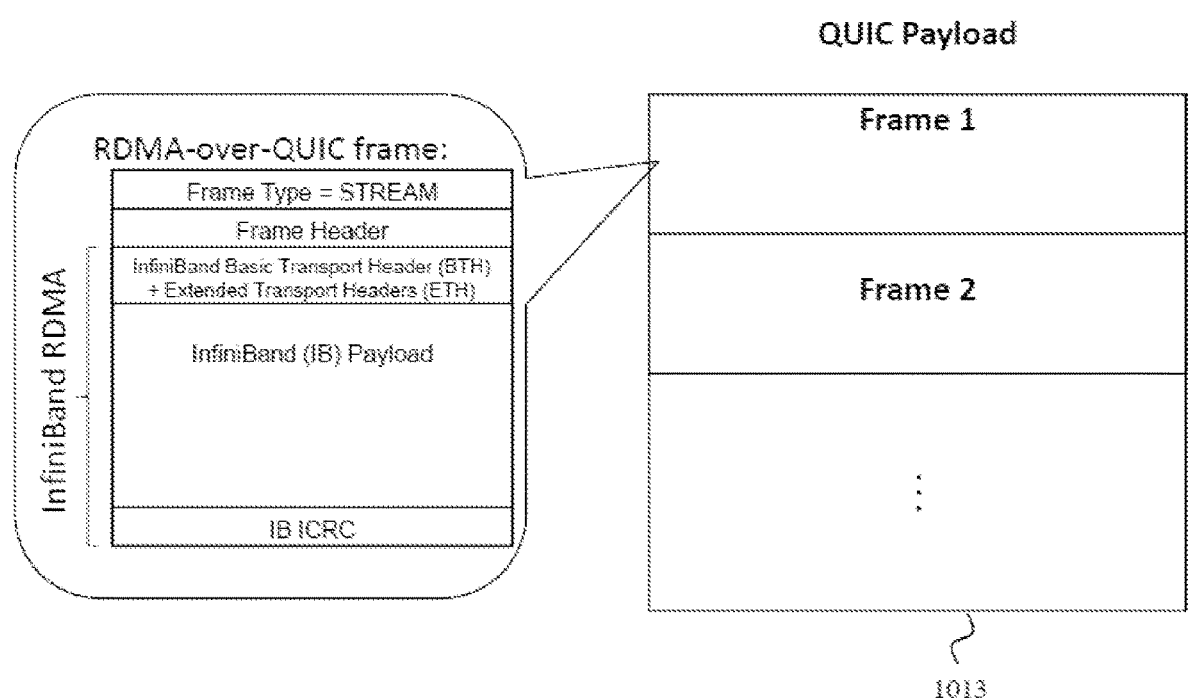
FIG. 4 shows an RDMA over QUIC frame according to an embodiment of the present disclosure.

A QUIC frame, according to an embodiment of the present disclosure, which includes an RDMA transaction is depicted in FIG. 4. In this embodiment, the RDMA transaction is an IB RDMA transaction. The frame type (i.e., STREAM) and frame header are as defined in the QUIC protocol. The basic transport header (BTH), extended transport headers (ETH), payload and invariant cyclic redundancy check (ICRC) are as defined in the IB specification. Notably, RDMA headers and the RDMA payload are carried inside the QUIC frames.

Embodiments of this disclosure provide one or more RDMA clients and an RDMA server, both comprise an API based on RDMA.

Figure 5:
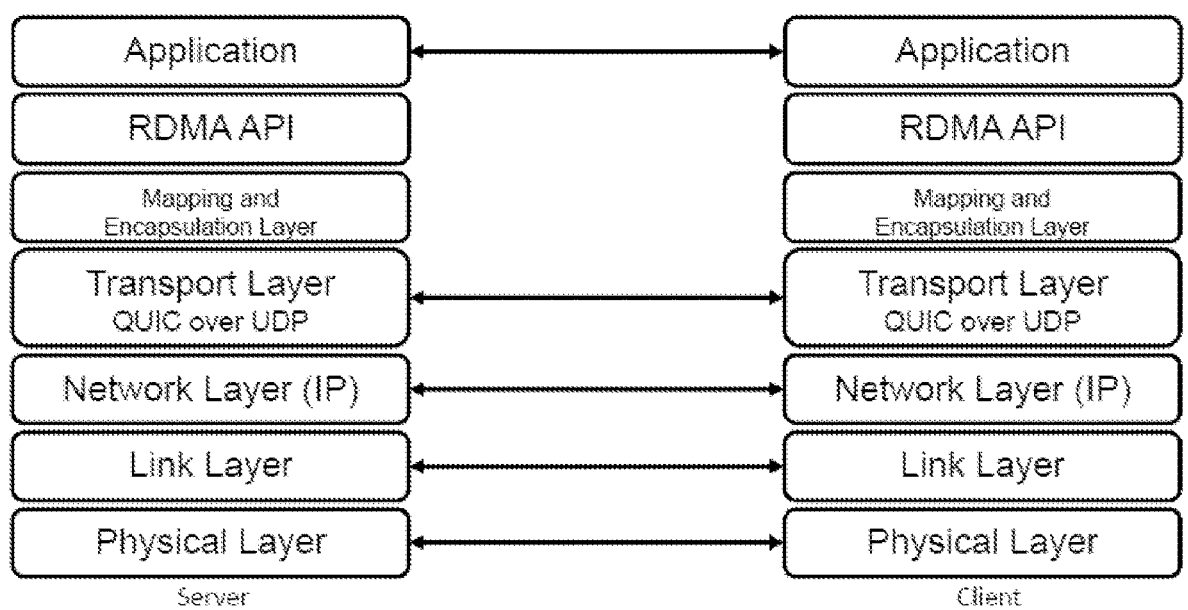
FIG. 5 shows a mapping and encapsulation layer in the protocol stack according to an embodiment of the present disclosure.

FIG. 5 depicts a mapping and encapsulation layer in the protocol stack, according to an embodiment of the present disclosure.

At both the RDMA client side and RDMA server sides, the mapping and encapsulation layer, as shown in FIG. 5, performs: mapping RDMA application requests and events (according to the API) to QUIC requests and events (according to the QUIC API); converting outgoing RDMA transactions to RDMA over QUIC, including adding a QUIC encapsulation to outgoing packets 101; and mapping received RDMA transactions over QUIC to RDMA transactions by removing the QUIC encapsulation and passing the RDMA transactions to the RDMA API.

That is, for outgoing packet, encapsulation, converting the RDMA transaction to RDMA over QUIC packet, will be performed. For incoming packet, decapsulation, converting the RDMA over QUIC packet to the RDMA transaction frame, will be performed. Notably, encapsulation and decapsulation are well-known terminologies in the field.

Optionally, according to an embodiment of the present disclosure, the network device 100 may be configured to receive an RDMA application request or event. Further, the network device 100 may be configured to map the RDMA application request or event to a QUIC request or event. Then, the network device 100 may be configured to generate the outgoing packet 101 according to the QUIC request or event.

Optionally, according to an embodiment of the present disclosure, the network device 100 may be further configured to receive the RDMA application request or event from the RDMA API. Further, the network device 100 may be configured to pass the one or more RDMA transactions obtained from the QUIC payload of the incoming packet to the RDMA API.

Figure 6:
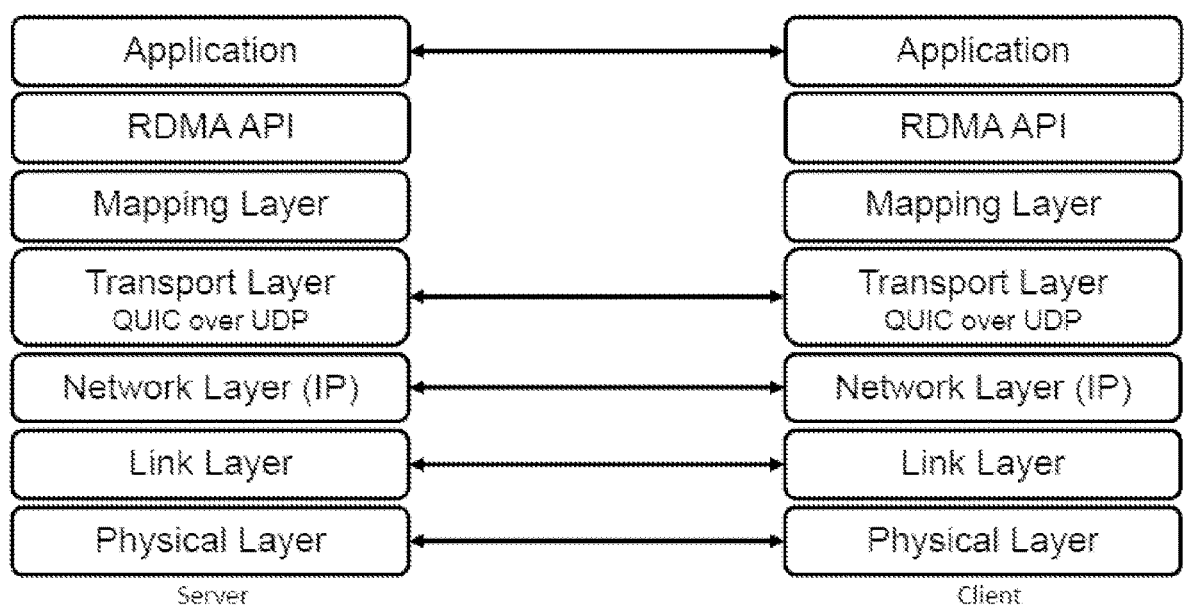
FIG. 6 shows a mapping layer in the protocol stack according to an embodiment of the present disclosure.

Optionally, according to an embodiment of the present disclosure, the QUIC encryption may also be disabled (non-standard mode), for instance in networks that do not require confidentiality protection. FIG. 6 depicts a mapping layer in the protocol stack, according to an embodiment of the present disclosure.

The IETF defines the encryption as part of the protocol. That is, there is no support for null encryption in a conventional QUIC protocol. The present disclosure proposes that the encryption may either be used or disabled. For instance, during the handshake phase, it will be negotiated. Probably as a different version, if it needs to support encryption of the negotiation (handshake) phase. Since currently the encryption is tightly coupled in the QUIC protocol, a new version may be created and kept as optional for secured close networks. The encryption takes time and impacts the latency and performance, it is thus desired to provide an option to the infrastructure and applications, with the ability to use or disable the encryption according to their needs and the network topology they are using.

To allow running RDMA over the QUIC transport protocol, according to an embodiment of the present disclosure, the network device 100 may be further configured to receive an incoming packet from another network device 110, wherein the incoming packet is a QUIC based packet, which comprises a UDP header, a QUIC header and a QUIC payload. Further, the network device 100 may be configured to detect whether the UDP header of the incoming packet comprises an indication that indicates that the QUIC payload of the incoming packet comprises one or more RDMA transactions. Then, the network device 100 may be configured to obtain the one or more RDMA transactions from the QUIC payload of the incoming packet, if the indication is detected in the UDP header of the incoming packet.

Optionally, according to an embodiment of the present disclosure, the network device 100 may be further configured to detect whether the UDP header of the incoming packet comprises an indication that indicates that the incoming packet carries the QUIC header and/or the QUIC payload.

For instance, for incoming packets, the network device 100 may detect RDMA over QUIC packets by the UDP header, using either a specific reserved UDP server port, or using a pre-configured UDP server port value.

In particular, a well-known UDP server port number may be used to indicate that the QUIC payload includes an RDMA transaction. In this context, "well-known" UDP server port number may refer to a configurable port number, or a standardized port number.

Optionally, the indication in the UDP header of the outgoing and/or incoming packet may comprise at least one of the following: a reserved UDP port number, reserved bits, a combination of source and destination addresses, and/or a pre-configured source and/or destination UDP port number value.

Notably, the reserved bits may be any bits defined as reserved on any header along the way. It is also possible to define a combination of a source UDP and a destination UDP as the indication of a QUIC packet carrying RDMA transactions over the payload of the QUIC packet.

Optionally, a dedicated QUIC version number for RDMA over QUIC may be used, in order to enable non-standard QUIC features. Notably, according to the QUIC protocol, each QUIC packet has a version field, which specifies the version of the protocol, thus guaranteeing compatibility between peers.

Figure 7:
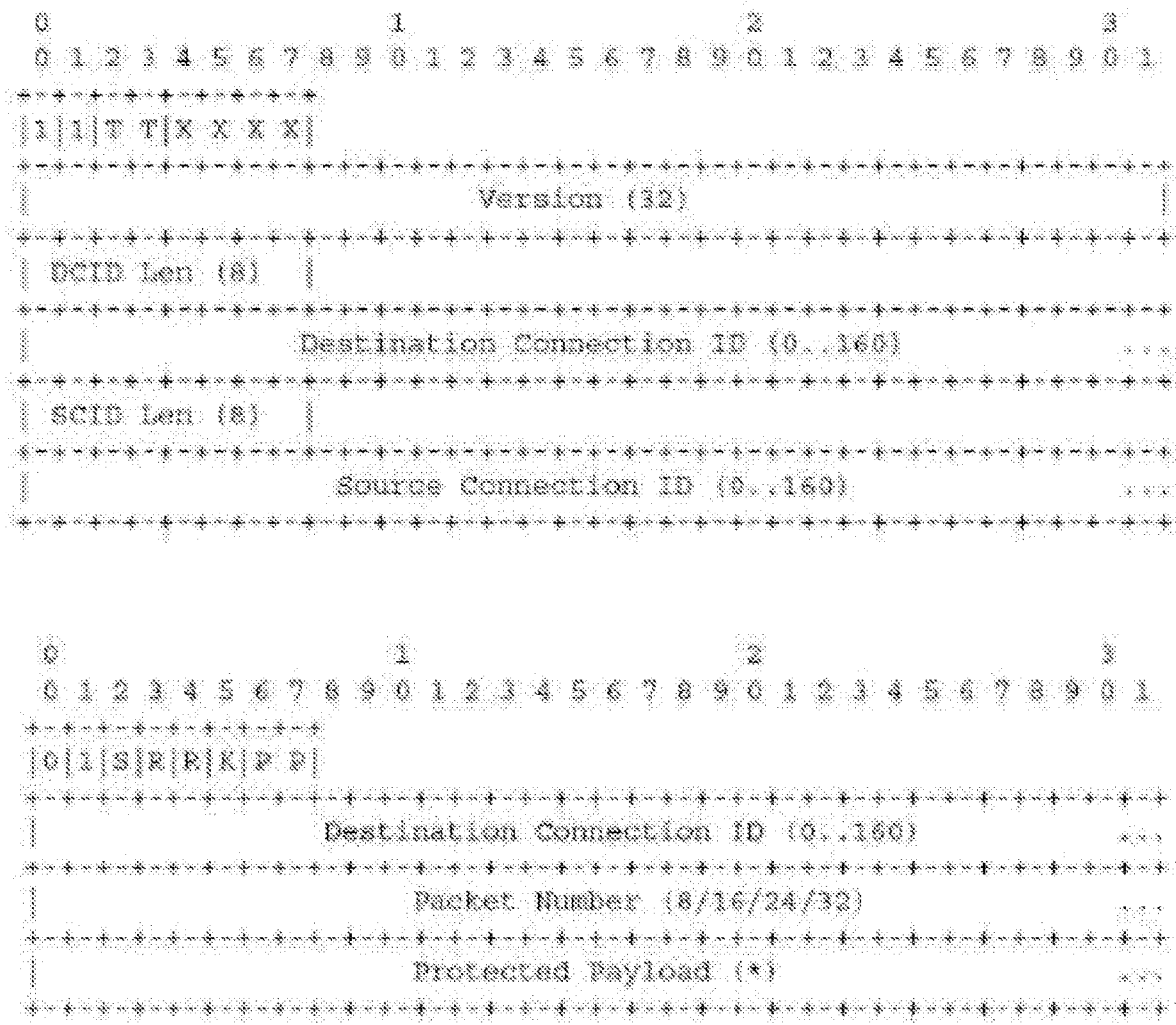
FIG. 7 shows a long header packet and a short header packet according to an embodiment of the present disclosure.

As shown in FIG. 7, a long header packet (the upper figure), according to an embodiment of the present disclosure, comprises a version field. A short header packet is also shown in FIG. 7 (the lower figure). Data path packets will usually use the short header packet instead of the long header packet. That is, for such short header packets, in general the version field, the source connection ID and connection ID length are no longer needed after the negotiation.

Therefore, according to an embodiment of the present disclosure, the outgoing and/or incoming packet may have a version field indicating a version of the QUIC based protocol.

According to embodiments of the present disclosure, the QUIC payload of the outgoing packet and/or the QUIC payload of the incoming packet may comprise one or more QUIC frames, and the one or more QUIC frames may comprise one or more RDMA transactions.

Notably, it may depend on the specific implementation structures of the QUIC packets (such as one QP per connection ID or one QP per stream, etc.). For instance, since a WQE, which is the RDMA transaction, could be 2 gigabytes (GB) long. It will need a few frames to slice it (that is, translated to a few packets on the wire). On other cases, it could be that a single frame contains a few small RDMA transactions (a few BTH headers packed into one frame).

Optionally, each QUIC frame of the QUIC payload of the outgoing packet and/or each QUIC frame of the QUIC payload of the incoming packet may comprise an RDMA transaction.

Optionally, according to an embodiment of the present disclosure, the one or more RDMA transactions comprise an IB RDMA transaction, an iWARP transaction, and/or a transaction according to any derivative of an RDMA protocol.

Notably, this disclosure allows to carry any RDMA protocol in the QUIC protocol.

Figure 8:
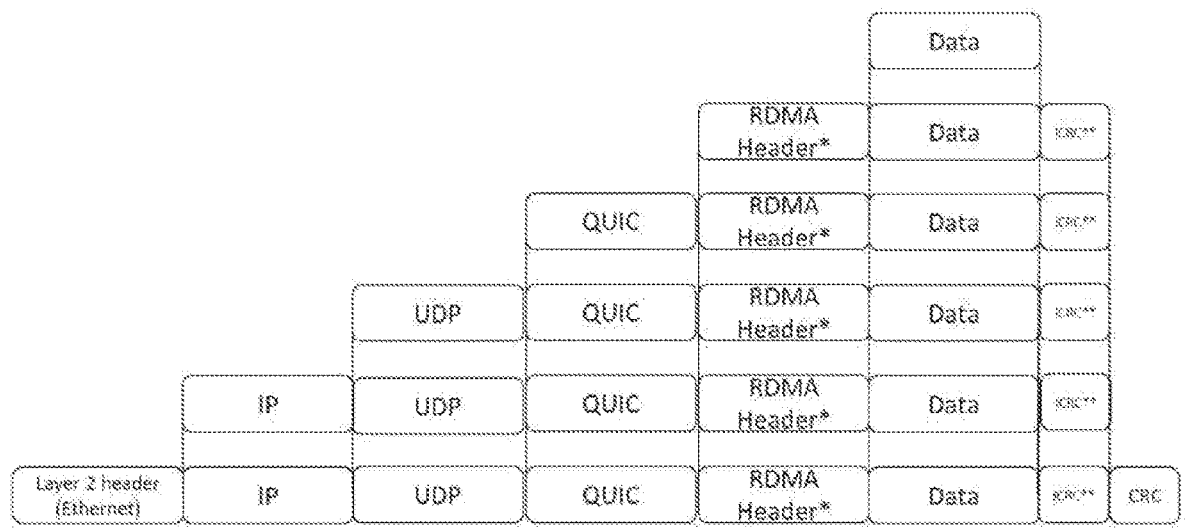
FIG. 8 shows high level packet layers according to an embodiment of the present disclosure.

FIG. 8 shows a high level packet layer according to an embodiment of the present disclosure. At the RDMA layer, the packet includes the RDMA headers such as BTH and ICRC, if it carries an IB RDMA packets. The QUIC header is preceded by IP and UDP headers (either Internet Protocol version 4 (IPv4) or Internet Protocol version 6 (IPv6)). The IP packet is encapsulated in a Layer 2 protocol, such as Ethernet.

Optionally, according to an embodiment of the present disclosure, among the one or more RDMA transactions, at least one RDMA transaction may be carried in a QP, or a group of QPs, and the QP or the group of QP is comprised by the one or more QUIC frames in the QUIC payload of the outgoing packet 101 and/or of the incoming packet.

Notably, a QP is a term that is defined in the IB specification. It is a pair of queues, one for transmitting RDMA requests, and one for receiving. The QP is responsible for scheduling work. Once the QP is established, an RDMA transaction, such as RDMA send, RDMA receive, RDMA read and RDMA write can be performed. A host may use multiple QPs for multiple types of transactions with different priorities.

Possibly, each QP or group of QPs is mapped to a separate QUIC connection. That is, a single QUIC connection could carry either a single RDMA connection (QP) content or more than one RDMA connection (QP). For example, if there are two QPs on a single host and their pair on another, it can potentially either have 2 QUIC connections to carry their data and map them one to one, or carry both of the QPs data over a single QUIC connection (either by different streams or any other chosen option).

Figure 9:
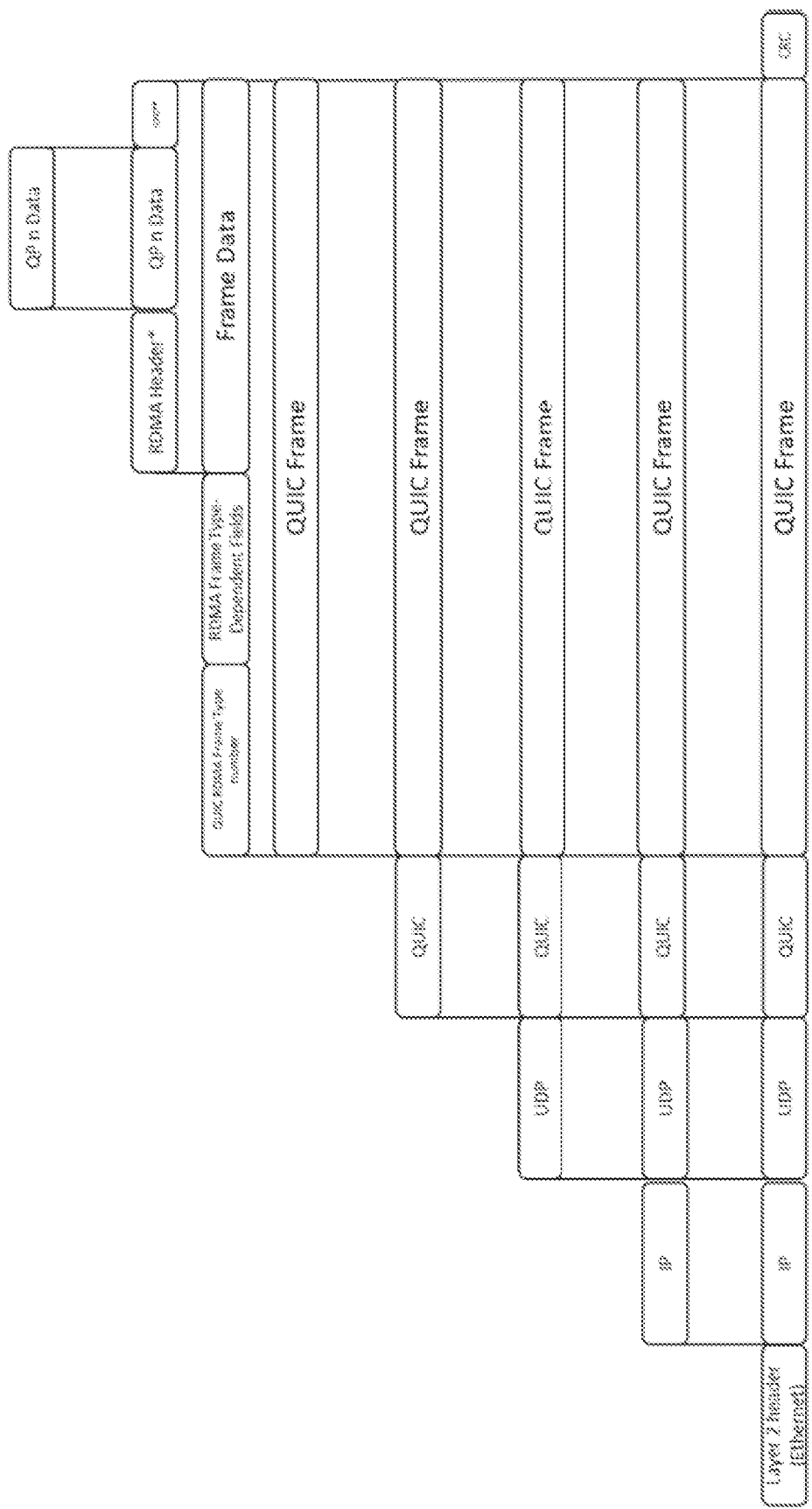
FIG. 9 shows a QUIC packet according to an embodiment of the present disclosure.

FIG. 9 shows a QUIC packet, according to an embodiment of the present disclosure, which contains a single QUIC frame. In particular, the QUIC frame contains the IB RDMA header and data. In this case, each QP has a unique QUIC connection (no sharing).

Optionally, according to an embodiment of the present disclosure, among the one or more RDMA transactions, at least one RDMA transaction is a WQE, and the WQE is comprised by the one or more QUIC frames in the QUIC payload of the outgoing packet 101 and/or of the incoming packet.

Notably, WQE is a term from the RDMA specification. A WQE is an RDMA transaction that is pushed into the QP, either to be transmitted to the peer, or having been received from the peer. Each outgoing WQE is transmitted as a separate short-lived stream.

Optionally, according to an embodiment of the present disclosure, each WQE may be encapsulated in a QUIC frame or broken down into multiple frames, if the WQE is too long to fit into a single frame. A QUIC packet may include multiple frames such that one or more of the frames is a WQE.

Figure 10:
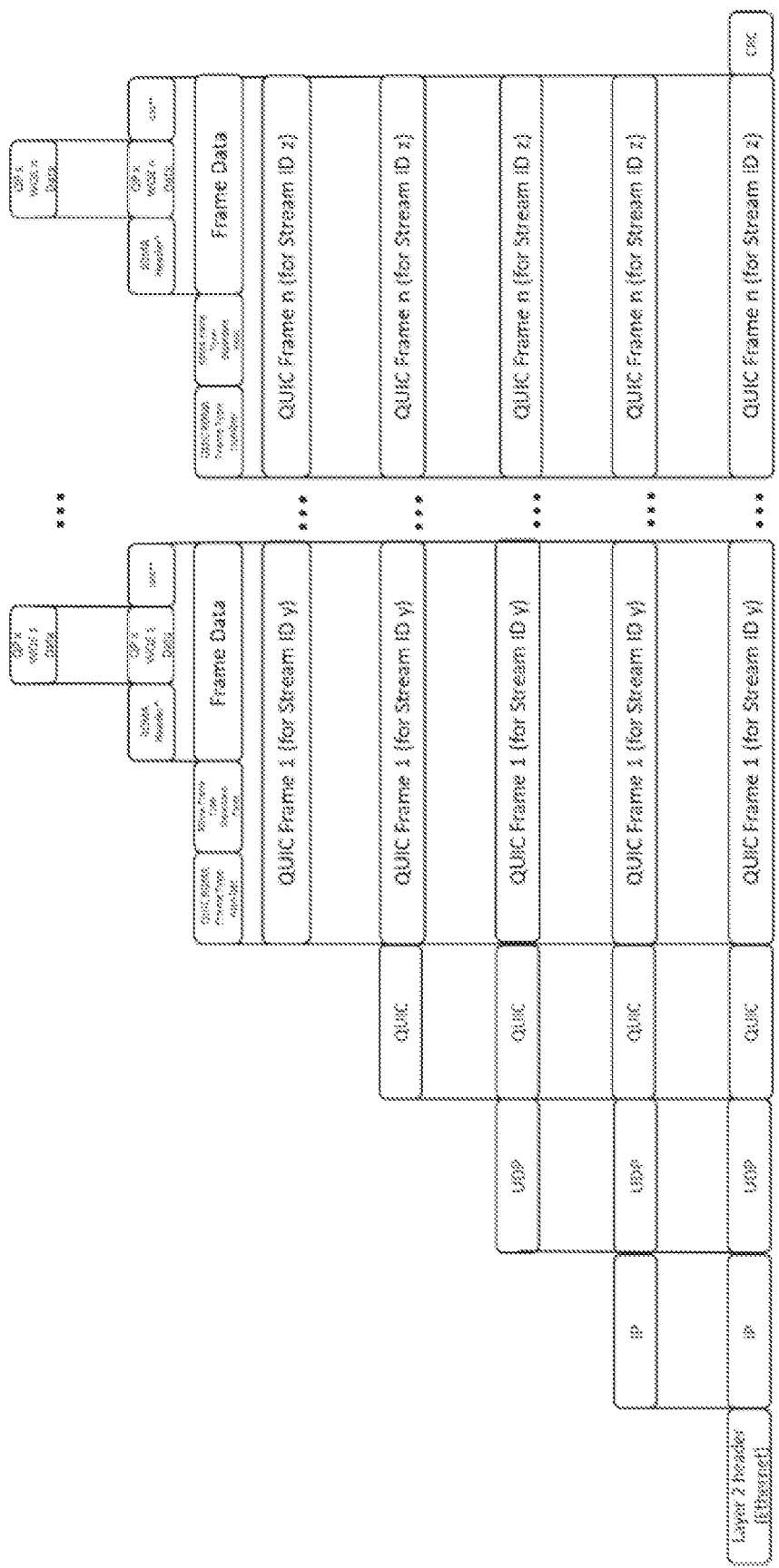
FIG. 10 shows a QUIC packet according to an embodiment of the present disclosure.

FIG. 10 shows a QUIC packet, according to an embodiment of the present disclosure, with multiple QUIC frames (1, . . . , n). Each frame belongs to a different stream, with a different stream ID. All the streams belong to the same QUIC connection. In this scenario, each QP has a unique QUIC connection, and WQEs use different stream IDs (pool of streams), within a single maximum transmission unit (MTU) or more than one MTU.

Figure 11:
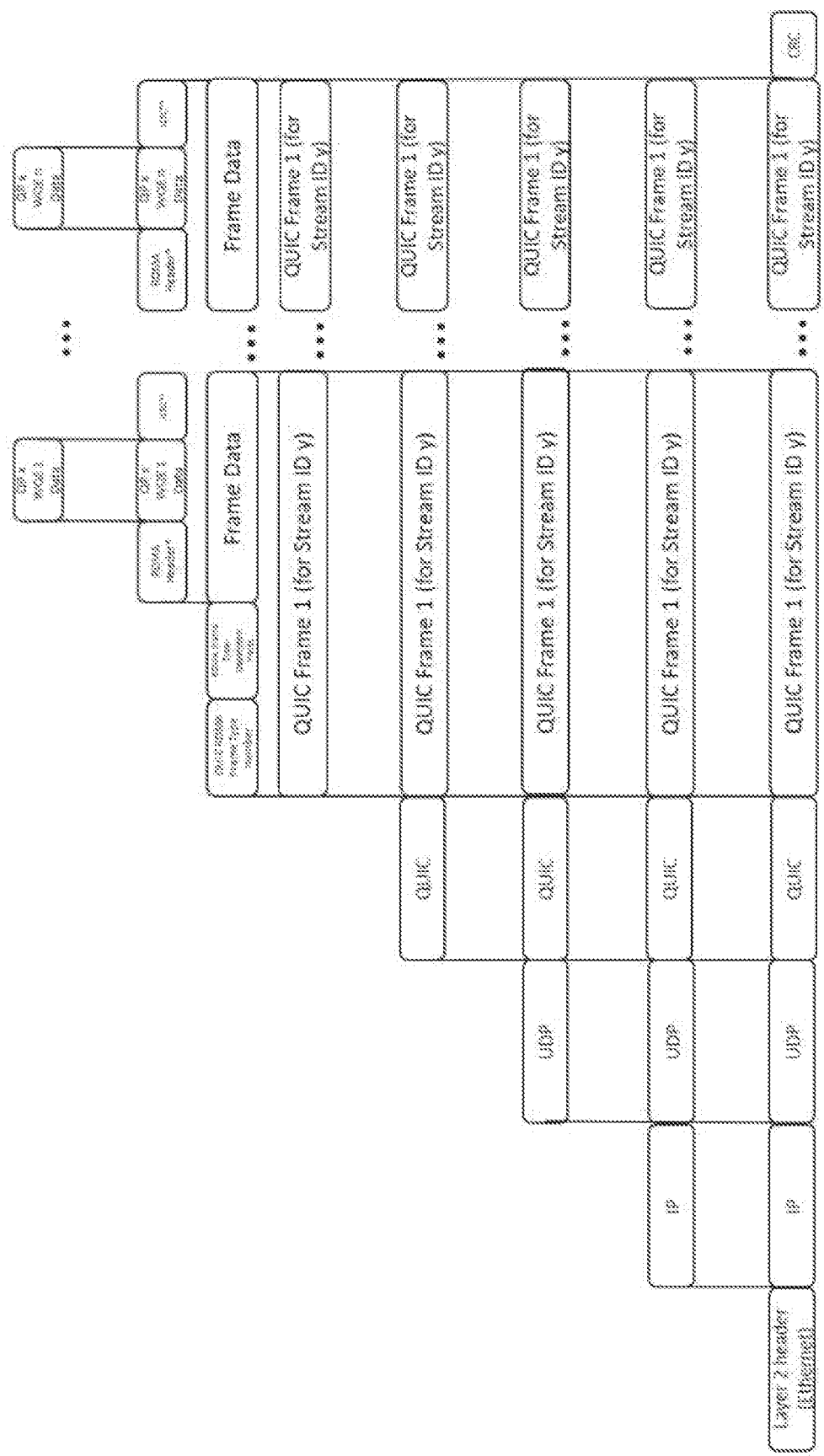
FIG. 11 shows a QUIC packet according to an embodiment of the present disclosure.

FIG. 11 shows a QUIC packet, according to an embodiment of the present disclosure, where each QUIC packet contains a single QUIC frame. Each QUIC frame contains multiple IB RDMA frames. Each RDMA frame has its own BTH, data, and ICRC. In this scenario, each QP has a unique QUIC connection, WQEs use same stream ID, but each stream can carry more than one BTH within a single MTU.

Figure 12:
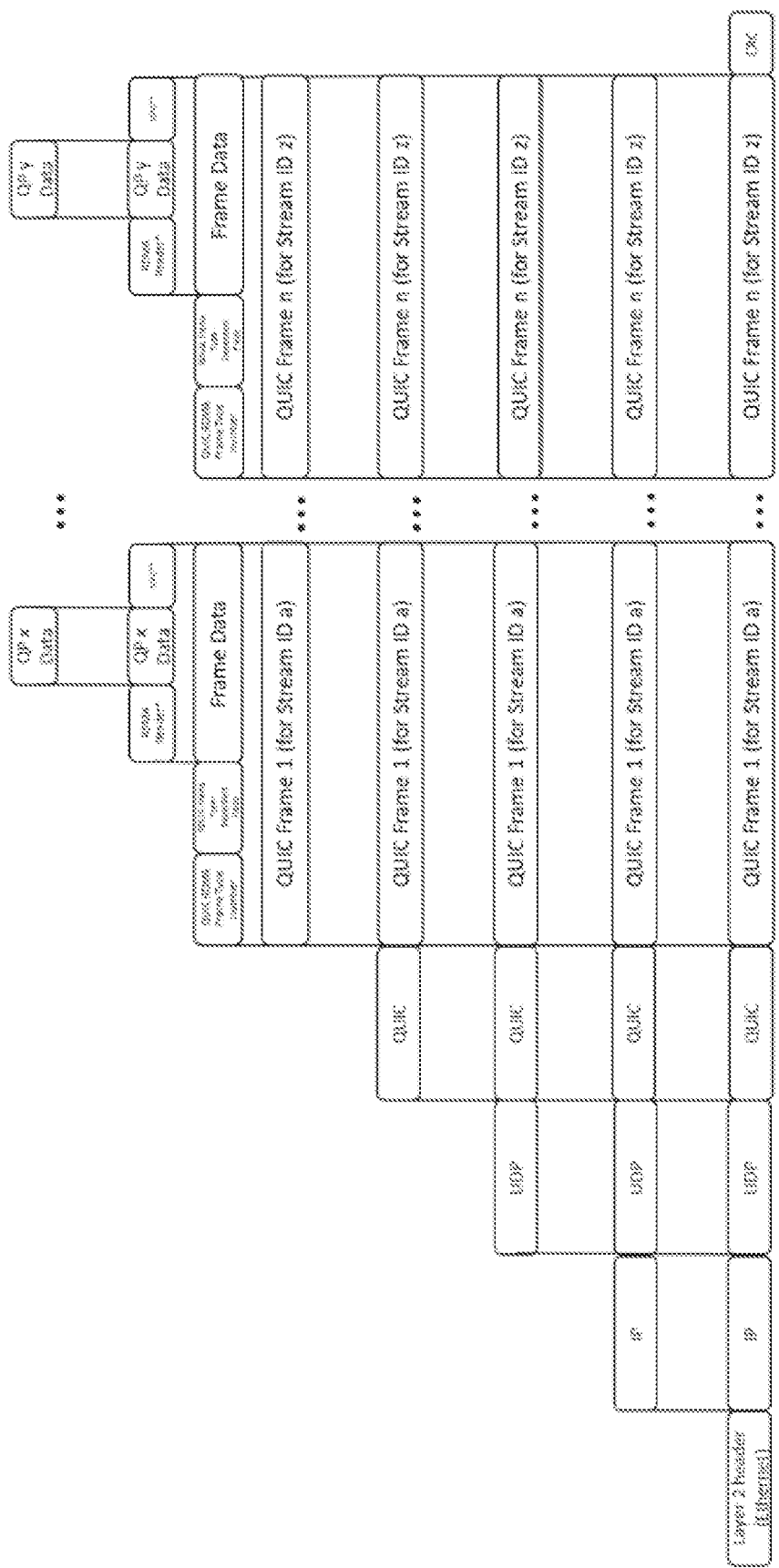
FIG. 12 shows a QUIC packet according to an embodiment of the present disclosure.

FIG. 12 shows another QUIC packet with multiple QUIC frames (1, . . . , n), according to an embodiment of the present disclosure. Each frame belongs to a different stream, with a different stream ID. All the streams belong to the same QUIC connection.

In conventional RDMA technologies, a new WQE can be finished (complete) before a previous posted WQE, according to the ordering policy, unless a fence has been set, but it won't generate a completion as the completions to the application must be generated in order according to the specification. Otherwise, it will be considered as a violation.

According to the present disclosure, an out-of-order transaction completion may be allowed as long as the completion entry is not posted to the application completion queue. In particular, short transactions may be complete before long transactions. That is, in elephant-mouse scenarios, short transaction/message (mouse) may be complete before long transaction/message (elephant). For example, when executing a write of 2 GB to a remote host, and an additional write of 2 bytes after the 2 GB with no fencing, at this scenario the 2 bytes write may be complete before the 2 GB write.

Typically, a completion queue (CQ) is created to notify the completion of transactions in work queue. Once a transaction is completed, a completion queue element (CQE) will be placed on the CQ. According to this embodiment of the present disclosure, short transactions may be completed before long transactions. However, it should be noted that application completion entries will be posted on the completion queue in order.

When using an encapsulation layer, the IB/RoCE/iWARP congestion control mechanisms are disabled, and QUIC congestion control provides reliability to the RDMA service. Since the RDMA headers are being carried over QUIC, it means that the QUIC layer will be the first one to process the packet (before RDMA), and therefore the congestion indication can be handled on the QUIC layer and it can be "mask" out from the next layers.

It should be understood that, embodiments of the present disclosure provide an innovative mapping layer between RDMA and QUIC. The disclosure utilizes mechanisms in QUIC that alleviate the need for similar mechanisms in the RDMA. The QUIC transport protocol that is used in embodiments of this disclosure can either be the standard version of QUIC, or future versions of this protocol, or it can be a non-standard variant. For example, a non-standard variant may include proprietary header fields, or may exclude some of the standard QUIC header fields.

Embodiments of the present disclosure enable all desired properties of RDMA technologies, which include: RDMA transport over packet-based (Ethernet/IP) network; RDMA transport over WAN, fast connection setup, built-in reliability (lossless or fast recovery), fast connection migration, low latency, overall bandwidth utilization and no infrastructure changes (as opposed to RoCE, for example, which relies on infrastructure features such as priority flow control).

This disclosure further proposes a data packet for RDMA, wherein the data packet is a QUIC based packet, which comprises a UDP header, a QUIC header and a QUIC payload, wherein the UDP header of the data packet comprises an indication that indicates that the QUIC payload of the data packet comprises one or more RDMA transactions, and wherein the QUIC payload of the data packet comprises the one or more RDMA transactions.

Figure 13:
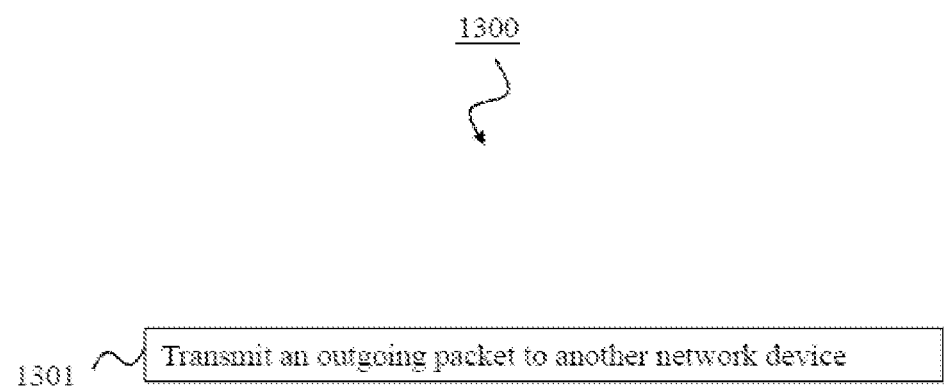
FIG. 13 shows a method according to an embodiment of the present disclosure.

FIG. 13 shows a method 1300 for RDMA according to an embodiment of the present disclosure. In a particular embodiment of the present disclosure, the method 1300 is performed by a network device 100 shown in FIG. 1. The method 1300 comprises a step 1301 of transmitting an outgoing packet 101 to another network device 110. In particular, the outgoing packet 101 is a QUIC based packet, which comprises a UDP header 1011, a QUIC header 1012 and a QUIC payload 1013. In particular, the UDP header 1011 of the outgoing packet 101 comprises an indication that indicates that the QUIC payload 1013 of the outgoing packet 101 comprises one or more RDMA transactions. Further, the QUIC payload 1013 of the outgoing packet 101 comprises the one or more RDMA transactions.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

Furthermore, any method according to embodiments of the present disclosure may be implemented in a computer program, having code means, which when run by processing means causes the processing means to execute the steps of the method. The computer program is included in a computer readable medium of a computer program product. The computer readable medium may comprise essentially any memory, such as a read-only memory (ROM), a programmable read-only memory (PROM), an erasable PROM (EPROM), a Flash memory, an electrically erasable PROM (EEPROM), or a hard disk drive.

Moreover, it is realized by the skilled person that embodiments of the network device 100 comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, trellis-coded modulation (TCM) encoder, TCM decoder, power supply units, power feeders, communication interfaces, communication protocols, etc. which are suitably arranged together for performing the solution.

Especially, the processor(s) of the network device 100 may comprise, e.g., one or more instances of a Central Processing Unit (CPU), a processing unit, a processing circuit, a processor, an ASIC, a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

What is claimed is:

1. A network device, comprising:
   a memory configured to store computer-executable instructions; and
   one or more processors coupled to the memory and configured to execute the instructions to cause the network device to:
   transmit an outgoing packet to another network device, wherein the outgoing packet is a first Quick User Datagram Protocol Internet Connection (QUIC)-based packet, which comprises a first User Datagram Protocol (UDP) header, a first QUIC header, a first QUIC payload, and a first version field indicating a first QUIC protocol version,
   wherein the first UDP header comprises a first indication that the first QUIC payload comprises one or more first remote direct memory access (RDMA) transactions,
   wherein the one or more first RDMA transactions comprise first RDMA headers and first RDMA payloads, and
   wherein the first RDMA headers and the first RDMA payloads are carried in QUIC frames.

2. The network device of claim 1, wherein the first UDP header further comprises a second indication that the outgoing packet carries the first QUIC header or the first QUIC payload.

3. The network device of claim 1, wherein the instructions further cause the network device to encrypt the outgoing packet before transmitting the outgoing packet to the other network device.

4. The network device of claim 1, wherein the instructions further cause the network device to:
   receive an RDMA application request or event;
   map the RDMA application request or event to a QUIC request or event; and
   generate the outgoing packet according to the QUIC request or event.

5. The network device of claim 4, wherein the network device further comprises an RDMA application programming interface (API), and wherein the instructions further cause the network device to receive the RDMA application request or event from the RDMA API.

6. The network device of claim 1, wherein the instructions further cause the network device to:
   receive an incoming packet from the other network device, wherein the incoming packet is a second QUIC-based packet, which comprises a second UDP header, a second QUIC header, a second QUIC payload, and a second version field indicating a second QUIC protocol version;

detect whether the second UDP header of the incoming packet comprises a second indication that the second QUIC payload comprises one or more second RDMA transactions; and obtain the one or more second RDMA transactions from the second QUIC payload when the second indication is detected in the second UDP header.

7. The network device of claim 6, wherein the instructions further cause the network device to detect whether the second UDP header comprises a third indication that the incoming packet carries the second QUIC header or the second QUIC payload.

8. The network device of claim 6, wherein the first UDP header or the second UDP header comprises a UDP server port number.

9. The network device of claim 6, wherein the first UDP header or the second UDP header comprises a reserved UDP port number, reserved bits, a combination of source and destination addresses, a pre-configured source UDP port number value, or a pre-configured destination UDP port number value.

10. The network device of claim 6, wherein the network device further comprises an RDMA application programming interface (API), and wherein the instructions further cause the network device to pass the one or more second RDMA transactions to the RDMA API.

11. The network device of claim 6, wherein the first QUIC payload or the second QUIC payload comprises one or more QUIC frames, and wherein the one or more QUIC frames comprise the one or more first RDMA transactions or the one or more second RDMA transactions.

12. The network device of claim 11, wherein each QUIC frame of the first QUIC payload comprises one of the one or more first RDMA transactions, or wherein each QUIC frame of the second QUIC payload comprises the one or more second RDMA transactions.

13. The network device of claim 11, wherein at least one of the one or more first RDMA transactions is carried in a queue pair (QP) or a group of QPs, and wherein the QP or the group of QPs is comprised by the one or more QUIC frames.

14. The network device of claim 11, wherein at least one of the one or more first RDMA transactions or one of the one or more second RDMA transactions is a Working Queue Element (WQE), and wherein the WQE is comprised by the one or more QUIC frames.

15. The network device of claim 1, wherein the one or more first RDMA transactions comprise an InfiniBand RDMA transaction, an Internet Wide Area RDMA Protocol (iWARP) transaction, or a transaction according to any derivative of an RDMA protocol.

16. The network device of claim 1, wherein the one or more first RDMA transactions comprises one or more short transactions and one or more long transactions, and wherein the instructions further cause the network device to handle the one or more short transactions before the one or more long transactions.

17. The network device of claim 1, wherein the network device is an RDMA server or an RDMA client.

18. The network device of claim 1, wherein the first indication in the first UDP header indicates that a next header after the first UDP header is the first QUIC header.

19. A method, comprising:
transmitting an outgoing packet to another network device,
wherein the outgoing packet is a Quick User Datagram Protocol Internet Connection (QUIC)-based packet, which comprises a User Datagram Protocol (UDP), header, a QUIC header, a QUIC payload, and a first version field indicating a first QUIC protocol version,
wherein the UDP header comprises an indication that the outgoing packet carries the QUIC payload and that the QUIC payload comprises one or more remote direct memory access (RDMA) transactions,
wherein the one or more RDMA transactions comprise RDMA headers and RDMA payloads, and
wherein the RDMA headers and the RDMA payloads are carried in QUIC frames.

20. A computer program product comprising computer-executable instructions configured to store on a non-transitory computer-readable medium that, when executed by one or more processors, cause a network device to:
transmit an outgoing packet to another network device,
wherein the outgoing packet is a first Quick User Datagram Protocol Internet Connection (QUIC)-based packet, which comprises a first User Datagram Protocol (UDP) header, a first QUIC header, a first QUIC payload, and a first version field indicating a first QUIC protocol version,
wherein the first UDP header comprises a first indication that the first QUIC payload comprises one or more first remote direct memory access (RDMA) transactions,
wherein the one or more first RDMA transactions comprise first RDMA headers and first RDMA payloads, and
wherein the first RDMA headers and the first RDMA payloads are carried in QUIC frames.

* * * * *